United States Patent
Kotler et al.

(10) Patent No.: US 7,752,671 B2
(45) Date of Patent: Jul. 6, 2010

(54) METHOD AND DEVICE FOR QUESTIONING A PLURALITY OF COMPUTERIZED DEVICES

(75) Inventors: Hilik Kotler, Holon (IL); Ron Shay Suchowski, Raanana (IL)

(73) Assignee: Promisec Ltd., Tel Aviv (IL)

( * ) Notice: Subject to any disclaimer, the term of this patent is extended or adjusted under 35 U.S.C. 154(b) by 1190 days.

(21) Appl. No.: 11/226,451

(22) Filed: Sep. 15, 2005

(65) Prior Publication Data

US 2006/0075128 A1     Apr. 6, 2006

Related U.S. Application Data

(60) Provisional application No. 60/672,050, filed on Apr. 18, 2005, provisional application No. 60/672,072, filed on Apr. 18, 2005, provisional application No. 60/672,045, filed on Apr. 18, 2005, provisional application No. 60/672,046, filed on Apr. 18, 2005.

(30) Foreign Application Priority Data

Oct. 4, 2004    (IL) .................................... 164402

(51) Int. Cl.
    *G06F 11/00*    (2006.01)
    *G06F 7/04*    (2006.01)
(52) U.S. Cl. .............................. 726/25; 726/22; 726/23; 726/26
(58) Field of Classification Search ................ 726/9, 726/22, 23, 25, 26
    See application file for complete search history.

(56) References Cited

U.S. PATENT DOCUMENTS

| | | |
|---|---|---|
| 5,050,213 A | 9/1991 | Shear |
| 5,163,147 A | 11/1992 | Orita |
| 5,251,294 A | 10/1993 | Abelow |
| 5,361,359 A | 11/1994 | Tajalli et al. |
| 5,604,800 A | 2/1997 | Johnson et al. |
| 5,610,981 A | 3/1997 | Mooney et al. |
| 5,694,472 A | 12/1997 | Johnson et al. |
| 5,696,822 A | 12/1997 | Nachenberg |
| 5,778,068 A | 7/1998 | Johnson et al. |
| 5,812,668 A | 9/1998 | Weber |
| 5,828,840 A | 10/1998 | Cowan et al. |
| 5,859,966 A | 1/1999 | Haymann et al. |
| 5,878,210 A | 3/1999 | Kong |

(Continued)

FOREIGN PATENT DOCUMENTS

JP    08-185315 A    7/1996

(Continued)

*Primary Examiner*—Nasser Moazzami
*Assistant Examiner*—Mohammad W Reza
(74) *Attorney, Agent, or Firm*—Browdy and Neimark, PLLC

(57)    ABSTRACT

Some embodiments of the present invention may relate to a device and a method of questioning computerized devices within an organization's network. The device, in accordance with some embodiments of the present invention, may include a questioning module and an agentless module. The questioning module may be adapted to receive data specifying a plurality of computerized devices to be questioned, and to receive data indicating which one or more questioning subjects are selected to be questioned on the specified computerized devices. The agentless module may be adapted to invoke and configure at least a remote access process, to question at least a registry of a remote computerized device. In accordance with some embodiments of the present invention, the questioning module may be adapted to utilize multiple threads of the agentless module to invoke and configure a plurality of remote access processes to question in parallel and without using agents at least a registry of the specified computerized devices, in accordance with the selected questioning subjects.

27 Claims, 4 Drawing Sheets

U.S. PATENT DOCUMENTS

| | | |
|---|---|---|
| 5,910,987 A | 6/1999 | Ginter et al. |
| 5,915,019 A | 6/1999 | Ginter et al. |
| 5,917,912 A | 6/1999 | Ginter et al. |
| 5,920,861 A | 7/1999 | Hall et al. |
| 5,941,947 A | 8/1999 | Brown et al. |
| 5,943,422 A | 8/1999 | Van Wie et al. |
| 5,943,424 A | 8/1999 | Berger et al. |
| 5,949,876 A | 9/1999 | Ginter et al. |
| 5,963,621 A | 10/1999 | Dimolitsas et al. |
| 5,964,889 A | 10/1999 | Nachenberg |
| 5,991,735 A | 11/1999 | Gerace |
| 6,006,328 A | 12/1999 | Drake |
| 6,026,379 A | 2/2000 | Haller et al. |
| 6,088,799 A | 7/2000 | Morgan et al. |
| 6,138,119 A | 10/2000 | Hall et al. |
| 6,151,606 A | 11/2000 | Mendez |
| 6,158,010 A | 12/2000 | Moriconi et al. |
| 6,185,683 B1 | 2/2001 | Ginter et al. |
| 6,237,786 B1 | 5/2001 | Ginter et al. |
| 6,253,027 B1 | 6/2001 | Weber et al. |
| 6,253,193 B1 | 6/2001 | Ginter et al. |
| 6,266,773 B1 | 7/2001 | Kisor et al. |
| 6,282,546 B1 | 8/2001 | Gleichauf et al. |
| 6,292,569 B1 | 9/2001 | Shear et al. |
| 6,295,639 B1 | 9/2001 | Van Der Meer |
| 6,298,445 B1 | 10/2001 | Shostack et al. |
| 6,304,915 B1 | 10/2001 | Nguyen et al. |
| 6,334,189 B1 | 12/2001 | Granger et al. |
| 6,336,135 B1 | 1/2002 | Niblett et al. |
| 6,366,967 B1 | 4/2002 | Wagner |
| 6,381,589 B1 | 4/2002 | Leon |
| 6,400,996 B1 | 6/2002 | Hoffberg et al. |
| 6,418,424 B1 | 7/2002 | Hoffberg et al. |
| 6,427,140 B1 | 7/2002 | Ginter et al. |
| 6,553,412 B1 | 4/2003 | Kloba et al. |
| 6,574,737 B1 | 6/2003 | Kingsford et al. |
| 6,587,836 B1 | 7/2003 | Ahlberg et al. |
| 6,618,806 B1 | 9/2003 | Brown et al. |
| 6,625,150 B1 | 9/2003 | Yu |
| 6,636,975 B1 | 10/2003 | Khidekel et al. |
| 6,640,229 B1 | 10/2003 | Gilmour et al. |
| 6,647,384 B2 | 11/2003 | Gilmour |
| 6,658,464 B2 | 12/2003 | Reisman |
| 6,671,813 B2 | 12/2003 | Ananda |
| 6,687,375 B1 | 2/2004 | Matyas, Jr. et al. |
| 6,714,962 B1 | 3/2004 | Helland et al. |
| 6,725,382 B1 | 4/2004 | Thompson et al. |
| 6,751,626 B2 | 6/2004 | Brown et al. |
| 6,779,120 B1 | 8/2004 | Valente et al. |
| 7,346,929 B1 | 3/2008 | Hammond |
| 2002/0026605 A1 | 2/2002 | Terry |
| 2002/0143921 A1 | 10/2002 | Stephan |
| 2003/0014636 A1 | 1/2003 | Ahlbrand |
| 2003/0041243 A1 | 2/2003 | Olguin et al. |
| 2003/0200308 A1 | 10/2003 | Tameda et al. |
| 2003/0212779 A1* | 11/2003 | Boyter et al. ............... 709/223 |
| 2004/0123157 A1 | 6/2004 | Alagna et al. |
| 2004/0128252 A1 | 7/2004 | Shirai et al. |
| 2004/0250112 A1 | 12/2004 | Valente et al. |
| 2005/0038827 A1 | 2/2005 | Hooks |
| 2005/0097199 A1* | 5/2005 | Woodard et al. ............ 709/223 |
| 2005/0193427 A1 | 9/2005 | John |
| 2007/0180490 A1 | 8/2007 | Renzi et al. |

FOREIGN PATENT DOCUMENTS

| | | |
|---|---|---|
| JP | 11-039157 A | 2/1999 |
| JP | 11-220610 A | 8/1999 |
| JP | 2001-282625 A | 10/2001 |
| JP | 2002-288136 A | 10/2002 |
| JP | 2003-058508 A | 2/2003 |
| JP | 2003-085048 A | 3/2003 |
| JP | 2003-167877 A | 6/2003 |
| JP | 2003-203051 A | 7/2003 |
| JP | 2003-280781 A | 10/2003 |
| JP | 2003-316650 A | 11/2003 |
| JP | 2004-030070 A | 1/2004 |
| JP | 2004-054706 A | 2/2004 |
| WO | WO 00/05651 A1 | 2/2000 |
| WO | WO 01/37157 A1 | 5/2001 |
| WO | WO 01/57628 A1 | 8/2001 |
| WO | WO 01/69352 A1 | 9/2001 |
| WO | WO 03/005268 A1 | 1/2003 |
| WO | WO 03/040945 A1 | 5/2003 |
| WO | WO 2004/023727 A1 | 3/2004 |

* cited by examiner

FIG.4A

| Group of Subjects | Subjects | Path/key/value/data | Indication |
|---|---|---|---|
| Anti-Virus | Symantec™ | | Not Installed |
| | Mcafee™ | | Not Installed |
| | Trend Micro™ | | Not Installed |
| Instant Messaging | ICQ™ | REG Key: HKLM\SOFTWARE\Mirabilis\ICQ<br>Process: ICQ.EXE<br>File: %Program Files%\Mirabilis\ICQ | Installed |
| | MSN Messenger™ | | — |
| | ••• | ••• | ••• |
| | Yahoo Messenger™ | | — |
| Unauthorized Hardware | Mass Storage Devices | | Installed |
| | Modems | HKEY_LOCAL_MACHINE\SYSTEM\Current ControlSet\Control\Class\{xxxxxxxxxx} | Installed |

FIG.4B

| Thread of ARAC | Device's ID | Subjects to be Questioned |
|---|---|---|
| A | 66.249.71.50-78<br>192.114.161.237 | Instant Messaging<br>Anti Virus Application<br>USB Devices |
| B | 66.249.71.55-65 | Instant Messaging – MSN Messenger |

METHOD AND DEVICE FOR QUESTIONING A PLURALITY OF COMPUTERIZED DEVICES

CROSS REFERENCE TO RELATED APPLICATIONS

This application claims the benefit of the following U.S. Provisional Applications: U.S. Provisional Application No. 60/672,050 filed on Apr. 18, 2005; U.S. Provisional Application No. 60/672,072 filed on Apr. 18, 2005; U.S. Provisional Application No. 60/672,045 filed on Apr. 18, 2005; and U.S. Provisional Application No. 60/672,046 filed on Apr. 18, 2005, and also the benefit of an Israeli Patent Application No. IL164402 filed on Oct. 5, 2004, which are all hereby incorporated by reference.

FIELD OF THE INVENTION

The present invention generally relates to the field of information security. More specifically, the present invention relates to a method and a device for enabling agentless and parallel questioning of at least the registries of a plurality of computerized devices under a common administrative domain, for example, to detect indications of potential threats.

BACKGROUND OF THE INVENTION

Information and digital information in particular, is at the heart of most organizations today. Regrettably, nowadays, information systems are under constant threat, and precious data is often at risk of being corrupted of being disclosed, or even stolen by an unauthorized party. The financial ramifications of these risks are too great for these risks to be ignored. Unfortunately, existing information security solutions are not able to provide a comprehensive solution, ensuring reliable and continuous protection against existing threats compromising the organizational data.

The reliance upon the Internet for carrying different kinds of communications, both within the organizations' networks and with the outside world (public, remote sites, business partners etc.), together with the introduction into the market and the proliferation of many sophisticated miniature storage devices (e.g., USB attachable devices used as disks) and other advanced technologies, present new security challenges to which there is no satisfying solution. Most existing IT security solutions are essentially improvements of existing solutions, and are based on the outdated assumption that threats come only from external sources (e.g., the Internet). Therefore most of the present IT security solutions regard entities within the organization's network as "trusted", whereas entities outside the organizations network are regarded as "untrusted". The increasing amount of threats making use of simple means and methods for creating backdoors into the internal organizational network is alarming evidence of the weakness of the peripheral defense approach, which includes for example, all existing gateway security products (e.g., firewalls, anti virus, content inspection, IDS/IPS and other filters). Indeed, world famous research groups recently estimated that over 80% of incidents of breaching organizational information security, originate from inside an organization itself (maliciously or due to lack of awareness); therefore, it is critically important to achieve a balance between the protection against external threats and internal ones (e.g., employees, contractors, etc.) and to provide security personnel with a focused solution, allowing them to effectively monitor activities involving computers in internal networks (for example, monitoring compliance with information security policies).

Attempts have been made to fill part of the security void described above, however, thus far, all the proposed solutions have suffered from major drawbacks, and either offer only a partial solution against the wide range of threats and/or are technologically lacking, and none is sufficiently comprehensive, straightforward, flexible and/or effective. For example, some solutions require that the network be scanned one computer after the other. For data security purposes, this is unacceptable due to the amount of time required to complete a questioning cycle of any significant number of devices. Other suggested partial solutions rely on agent applications which must be installed on each device which is to be questioned and then must be managed on each of the devices where it is installed. An agent based solution requires that each computerized device, which is to be allowed to communicate with the organization's networks, be installed with the appropriate agent application. The installations alone, whether they are automatic, semi-automatic or manual, require substantial human resources and may be quite time consuming. An agent installation on any number of servers and workstations may fail to operate without such failure being noticed, causing a severe and undetected security breach. Agent installation is problematic from a technical point of view as well. When installing an agent, and as long as the agent is installed, it is necessary to ensure for each computerized device on which the agent is or is being installed that there are no conflicts between the agent application and other software components on the computerized device. Such conflicts may hamper or even neutralize the operation of the agent. This creates a further ongoing burden on system administration resources and personnel. In addition to the above, agent applications, even during normal operation, are wasteful of local and network resources.

A different group of information security tools includes various vulnerability scanners. Vulnerability scanners are typically used to detect unnecessary/unauthorized services, such as open ports for example, and other vulnerabilities, which are only a part of the vulnerabilities on the network and/or operating system level. Vulnerability scanners are not able to address all threats on the Operating System level as well as threats which operate on the application level, which are quite common and may cause considerable damage to the organization. Another group of tools of interest, although not specifically intended for information security purposes, are inventory/asset modules. Inventory modules are commonly used by system administrators or by logistic personnel to produce inventory lists which include various hardware and software resources installed on the computers monitored by the inventory modules. However, as mentioned above, inventory modules are not intended for security purposes, and consequently are not able to produce inventory data which is focused on security threats. The data which may be produced by inventory modules typically includes a large amount of irrelevant data and the data relating to security threats may often be only partial from an information security perspective. Furthermore, in order to have some (although limited) relevance for purposes of information security, an additional process of analyzing the large amount of data returned by the inventory modules is required in order to discover potential threats. This analysis, as well as being lengthy, requires special expertise and great care. Furthermore, inventory modules are not able to scan a large number of computers in a substantially short time, and thus there could be some chance that a security threat will remain undetected by the inventory module for a substantially long period of time, and may even not be detected at all. Some security threats need only a short period of time to cause substantial damage and must be detected and stopped as quickly as possible. Therefore, due to the long period of time required to obtain the inventory lists and the additional amount of time required to analyze the returned data, as well as their lack of focus on security threats, inventory modules cannot provide an adequate IT security solution.

SUMMARY OF THE INVENTION

There is thus a need for a system, method and device for efficiently questioning computerized devices within an organization's network. There is a further need to provide such a system and method capable of remotely scanning in parallel a plurality of computerized devices for one or more subjects associated with security threats, without using agent applications. There is yet a further need to provide such a system and method which is substantially comprehensive, straightforward and flexible.

Some embodiments of the present invention may relate to a device and a method of questioning computerized devices within an organization's network. The device in accordance with some embodiments of the present invention may include a questioning module adapted to receive data specifying a plurality of computerized devices to be questioned, and to receive data indicating which one or more questioning subjects are to be questioned on the specified computerized devices. In accordance with some embodiments of the present invention, the questioning module may be adapted to invoke and configure a plurality of remote access processes to question in parallel and without using agents at least a registry of the specified computerized devices, in accordance with the selected questioning subjects.

According to further embodiments of the present invention, the device for questioning computerized devices within an organization's network may include a questioning module and an agentless module. The questioning module may be adapted to receive data specifying a plurality of computerized devices to be questioned, and to receive data indicating which one or more questioning subjects are selected to be questioned on the specified computerized devices. The agentless module adapted to invoke and configure at least a remote access process, to question at least a registry of a remote computerized device. In accordance with some embodiments of the present invention, the questioning module may be adapted to utilize multiple threads of the agentless module to invoke in parallel and configure a plurality of remote access processes to question in parallel and without using agents at least a registry of the specified computerized devices, in accordance with the selected questioning subjects. In accordance with some embodiments of the present invention, the questioning module is adapted to utilize in parallel a substantially large number of threads of said agentless module.

In accordance with further embodiments of the present invention, the questioning subjects may be associated with security threats. In accordance with yet further embodiments of the present invention, the questioning subjects may be associated with one or more specific locations within at least the registry of a computerized device, where an indication of a security threat may be found during questioning.

In accordance with some embodiments of the present invention, the questioning module may be adapted to select which one or more of the questioning subjects are to be questioned on each of the computerized devices. According to further embodiments of the device of the present invention, the device may further include a user interface. The user interface may enable, for example, for a user to select, either directly or indirectly, one or more of the computerized devices to be questioned. The user interface may further enable a user to select, either directly or indirectly, which one or more questioning subjects are to be questioned on one or more of the specified computerized devices to be questioned.

In accordance with some embodiments of the present invention, the questioning module may be adapted to determine the number of threads of the agentless module to be utilized to question the specified computerized devices. The questioning module may be adapted to determine the number of threads of the agentless module which are to be utilized, in accordance with one or more of the following: the number of computerized devices to be questioned, the desired scanning speed, one or more network performance parameters, the subjects to be questioned, and/or the threat's severity. For example, in case it is determined or it is indicated that a certain one or more of the questioning subjects to be questioned on the computerized devices is associated with a severe security threat, the questioning module may be configured to invoke, for example, a substantially large number of threads of the agentless module.

In accordance with some embodiments of the present invention, the questioning module may be adapted to assign to each thread of the agentless module one or more of the specified computerized devices. In accordance with further embodiments of the present invention, the questioning module may be adapted to assign to each thread of the agentless module one or more questioning subjects selected to be questioned on one or more of the specified computerized devices assigned to that thread of the agentless module.

In accordance with some embodiments of the present invention, each thread of the agentless module may be adapted to configure each of the invoked remote access processes to question one or more specific locations within the computerized devices assigned to that thread, in accordance with the questioning subject selected to be questioned on the computerized devices. In accordance with further embodiments of the present invention, each thread of the agentless module may be adapted to configure each of the invoked remote access processes to question one or more specific locations within at least a registry of the computerized devices assigned to that thread, in accordance with the questioning subject selected for each of the computerized devices and which have been assigned to that thread.

According to some embodiments of the present invention, the questioning module may be adapted to assign to one or more threads of the agentless module predefined data corresponding to certain data which may be found in one or more of the specified locations associated with one or more of the questioning subjects assigned to that or these thread or threads. In accordance with further embodiments of the present invention, one or more of the agentless modules may be adapted to configure one or more of the invoked remote access processes to compare the actual data found in one or more specific locations within the computerized devices associated with one or more of the questioning subjects assigned to that or these threads against the predefined data associated with the one or more of the questioning subjects, which correspond to the data which may be found in one or more of the specified locations.

According to some embodiments of the device of the present invention, the device may further include one or more databases. In accordance with further embodiments of the present invention one or more of the databases may include prestored data corresponding to one or more computerized devices. In accordance with yet further embodiments of the present invention, as part of specifying the computerized devices to be questioned, prestored data corresponding to computerized devices may be obtained from the database. In accordance with some embodiments of the present invention, one or more of the databases may include prestored data corresponding to one or more questioning subjects. In accordance with further embodiments of the present invention, as part of selecting one or more questioning subjects to be questioned on the specified computerized devices, prestored data corresponding to one or more questioning subjects may be obtained from the database.

According to some embodiments of the device of the present invention, the device may further include a results analysis module. The results analysis module may be adapted to process the results received in response to the questioning of at least the registry of the specified computerized devices. The results analysis module may be adapted to generate a report corresponding to the results. In accordance with further embodiments of the present invention, the results analysis module may be adapted to execute one or more predefined actions or procedures based on one or more of the received results. For example, in accordance with embodiments of the present invention, the results analysis module may be adapted to utilize one or more threads of the agentless module to invoke and configure one or more remote access processes to modify or delete certain data on one or more of the remote computerized devices which were questioned.

According to some embodiments of the present invention a method of questioning computerized devices within an organization's network may include specifying a plurality of computerized devices to be questioned, selecting one or more questioning subjects to be questioned on the specified computerized devices and invoking in parallel and configuring a plurality of remote access processes to question in parallel and without using agents at least a registry of the specified computerized devices, in accordance with the selected questioning subjects.

In accordance with further embodiments of the present invention, the selecting of one or more questioning subjects may further include, selecting which one or more of the questioning subjects that are to be questioned on each of the specified computerized devices.

According to some embodiments of the method of the present invention, the method may further include utilizing in parallel a plurality of threads of an agentless module, each of the threads being adapted to invoke and configure at least one remote access processes to question at least a registry of a remote computerized device. According to further embodiments of the present invention the utilizing may further include assigning to each of the plurality of threads of an agentless module one or more of the specified computerized devices, and one or more of the questioning subjects to be questioned on the one or more computerized devices.

According to some embodiments of the method of the present invention, the method may further include determining the number of threads of the agentless module to be invoked in accordance with one or more of the following: the number of computerized devices to be questioned, the desired scanning speed, one or more network performance parameters, the subjects to be questioned and/or the threat's severity. According to further embodiments of the present invention, the assigning may further include assigning to one or more of the of threads of the agentless module data corresponding to one or more specific locations within the computerized devices assigned to that or these threads, in accordance with one or more of the questioning subjects selected to be questioned on the computerized devices.

According to some embodiments of the method of the present invention, the method may further include receiving results in response to the questioning of at least the registry of the specified computerized devices, and generating a report corresponding to the results received in response to the questioning of the specified computerized devices. According to further embodiments of the method of the present invention, the method may further include executing one or more predefined actions or procedures based on one or more of the received results. According to yet further embodiments of the method of the present invention, the method may further include utilizing one or more threads of the agentless module to invoke and configure one or more remote access processes to modify or delete certain data on one or more of the remote computerized device which were questioned.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4A is an illustration of one example of a possible questioning subjects database including data associated with questioning subjects; and FIG. 4B is an illustration of one example of a table including an entry for each thread of the agentless module to be utilized and the data corresponding to the computerized device(s) and to the questioning subject(s) assigned to that thread of the agentless module, according to some embodiments of the present invention.

Figure 1:
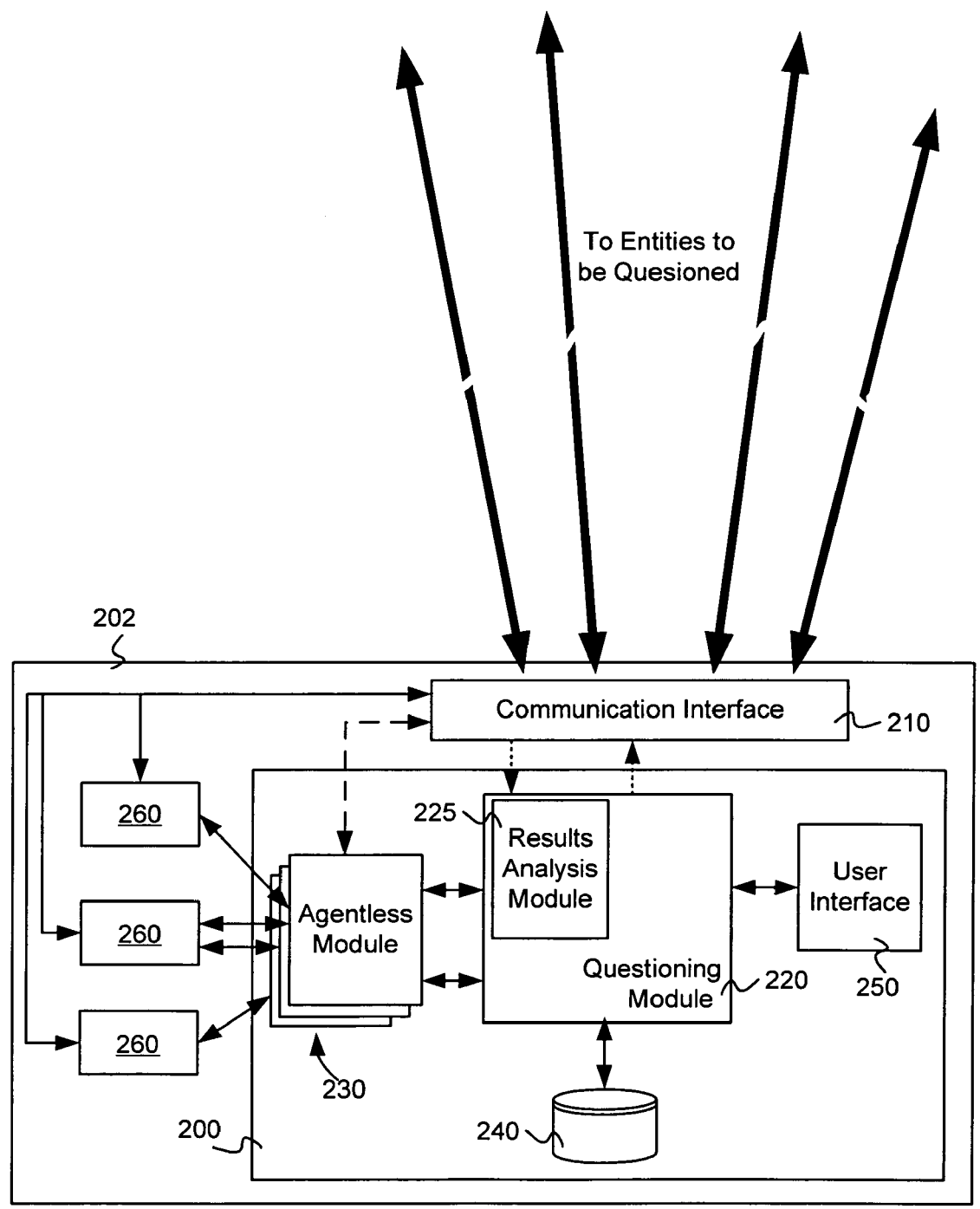
FIG. 1 is an enlarged illustration of a device for questioning computerized devices within an organization's network, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "assigning" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Throughout the specification and the claims the term "organization's network", unless stated otherwise, shall be used to mean any group of computerized devices forming a network of an organization. An organization's network as used herein, unless stated otherwise, may be comprised of one or more interconnected LANs (Local Area Networks) over any type of connection, WANs (Wide Area Networks), and/or wireless communication networks, etc, and any combination thereof. The organization's network may be under a single administrative domain or under more than one administrative domain and may include one or more additional computerized devices which are not connected to the organizational network on a regular basis, but which are at least partially under the control of the organization's network administer(s).

Reference is now made to FIG. 1, which is an enlarged illustration of a device for questioning computerized devices within an organization's network, according to some embodiments of the present invention. In accordance with some embodiments of the present invention, a device 200 for questioning computerized devices within an organization's network may include a questioning module 220 and an agentless module 230. In accordance with some embodiments of the present invention, the questioning module 220 may be operatively connected to the agentless module 230. It should be noted that, according to some embodiments of the present invention, the agentless module 230 may be integrated into the questioning module 220.

Figure 2:
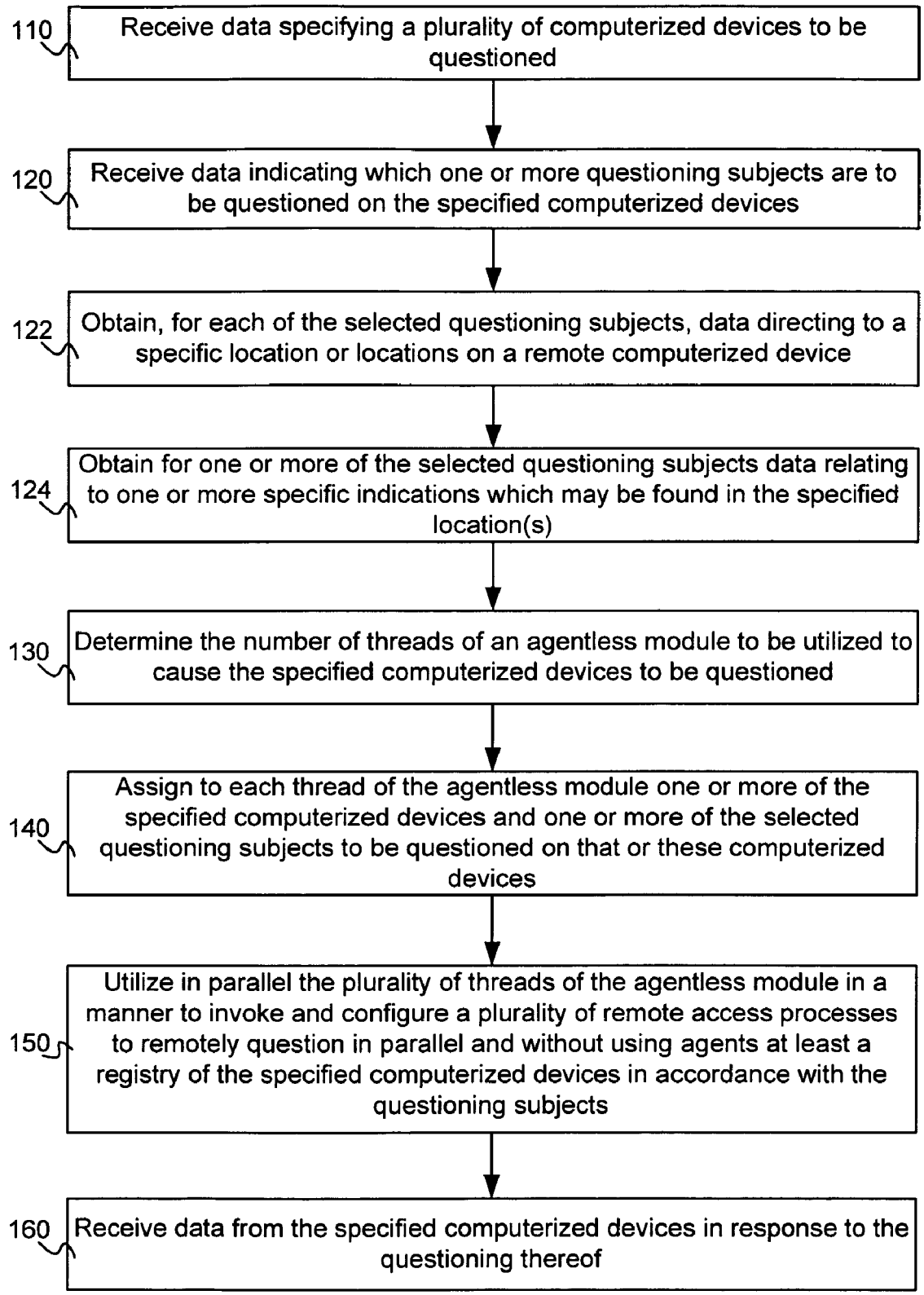
FIG. 2 is a flow chart illustration of some embodiments of a method of questioning computerized devices within an organization's network, according to some embodiments of the present invention.

Reference is now additionally made to FIG. 2, which is a flow chart illustration of some embodiments of a method of questioning computerized devices within an organization's network, according to some embodiments of the present invention. In accordance with some embodiments of the present invention, the questioning module 220 may be adapted to receive data specifying a plurality of computerized devices to be questioned (block 110). In addition, the questioning module 220 may be adapted to receive data corresponding to one or more selected questioning subjects to be questioned on the specified computerized devices (block 120). Additional discussions relating to the nature of the questioning subjects shall be provided hereinbelow with reference to yet further embodiments of the present invention.

According to some embodiments of the present invention, in accordance with the specified computerized devices to be questioned and/or in accordance with the selected questioning subjects to be questioned, the questioning module 220 may be adapted to determine the number of threads of the agentless module 230 to be utilized or activated (block 130). The questioning module 220 may be adapted to assign to each thread of the agentless module 230 one or more (of the specified) computerized devices to be questioned and one or more (of the selected) questioning subjects to be questioned on that or these computerized devices (block 140). According to some embodiments of the present invention, in some cases one or more computerized devices to be questioned may be assigned to a certain thread of the agentless module 230 together with all the questioning subjects selected for that or these computerized device, whereas in other cases, a certain group consisting of one or more computerized devices may be assigned to two or more threads of the agentless module 230, and the questioning subjects selected for that group of computerized devices may be divided among the threads to which the group has been assigned.

According to some embodiments of the present invention, the questioning module 220 may be adapted to obtain, and to provide to each thread of the agentless module 230, any data which may be necessary to facilitate the questioning of the computerized devices assigned thereto in accordance with the questioning subjects selected for that or these computerized devices and which have been assigned to that thread of the agentless module 230. Some examples of such information will be described in greater detail hereinbelow. Further discussions relating to the number of threads to be utilized and relating to the assignment of the computerized devices and the questioning subjects to be questioned and also discussions relating to the kinds of data which may be provided to the agentless module 230, shall be provided hereinbelow.

According to some embodiments of the present invention, the agentless module 230 may be operatively coupled to a remote access process or module 260. In accordance with some embodiments of the present invention, the remote access process 260 may be capable of questioning at least the registry of a remote computerized device without using agents. In accordance with further embodiments of the present invention, the remote access process 260 may also be adapted to modify (write, overwrite, modify, delete, etc) data stored within at least the registry of a remote computerized device. According to further embodiments of the present invention, the remote access process 260 may be adapted to question a specific location within at least the registry of a remote computerized device upon receiving appropriate instructions or upon being appropriately programmed or configured to question the specific location within at least the registry of a particular computerized device.

In accordance with some embodiments of the present invention, each thread of the agentless module 230 may be adapted to invoke at least one (and typically one, for example) remote access process 260. Thus, according to some embodiments of the present invention, a plurality of threads of the agentless module 230 may be adapted to invoke, simultaneously, a plurality of remote access processes 260. As part of invoking the remote access process, each thread of the agentless module 230 may be adapted to configure at least one remote process 260. In accordance with further embodiments of the present invention, each thread of the agentless module 230 may be adapted to configure the at least a remote access process 260 to access (and to question) one or more specific locations within at least the registry of one or more specific computerized devices. In accordance with some embodiments of the present invention, the questioning module 220 may be adapted to utilize in parallel multiple threads of the agentless module 230 to invoke a plurality of remote access processes 260 to question in parallel and without using agents, at least a registry of the specified computerized devices, in accordance with the selected questioning subjects. In accordance with some embodiments of the present invention, as part of utilizing or activating the threads of the agentless module 230, the questioning module 220 may be adapted to configure each of the threads of the agentless module 230 being utilized to cause one or more remote access processes 260 to be invoked in a manner to remotely question without using agents, at least a registry of one or more computerized devices assigned to that thread of the agentless module 230, in accordance with one or more questioning subjects selected to be questioned on that or these computerized devices and which (the questioning subject selected for that computerized device(s)) have been assigned to that thread of the agentless module 230 (block 150).

As part of some embodiments of the present invention, each of the remote access processes 260 may be configured to generate for one or more of the questioning subjects to be questioned on one or more of the computerized devices, an appropriate query and to utilize the communication module 210 to remotely question the computerized device in accordance with the questioning subject. As part of further embodiments of the present invention, the communication module 210 may be used by a plurality of remote access processes to question in parallel at least a registry of the specified computerized devices. As part of further embodiments of the present invention, each of the remote access processes 260 may be adapted to extract from a remote computerized device being questioned, any relevant indication corresponding to the data found (or the lack of thereof) in a specific location associated with a questioning subject. As part of extracting the data, each of the remote access processes 260 may be configured to return the indications extracted from the remote computerized device in connection with the questioning subjects to device 200 or to any of its components. As part of further embodiments of the present invention, the specific location in which the remote access process is to look for the data (or the lack of thereof), may be provided to the remote access process by one of the threads of the agentless module 230 during the configuration of that remote access process 260. It should be noted that as part of some embodiments of the present invention, each of the remote access process may be adapted to utilize any known or tools yet to be devised in the future, for questioning designated destinations on a remote computerized device, including but not limited to various tools which are a part of some operating systems presently sold on the market. It should also be noted that some embodiments of the present invention are not limited to the use of any particular remote access process.

In accordance with some embodiments of the present invention, the process described above may be initiated manually and/or may be launched automatically. For example, the process described above may be scheduled and may be automatically initiated at predefined times. In accordance with a further example, the process may be automatically launched in response to a predefined event.

Figure 3:
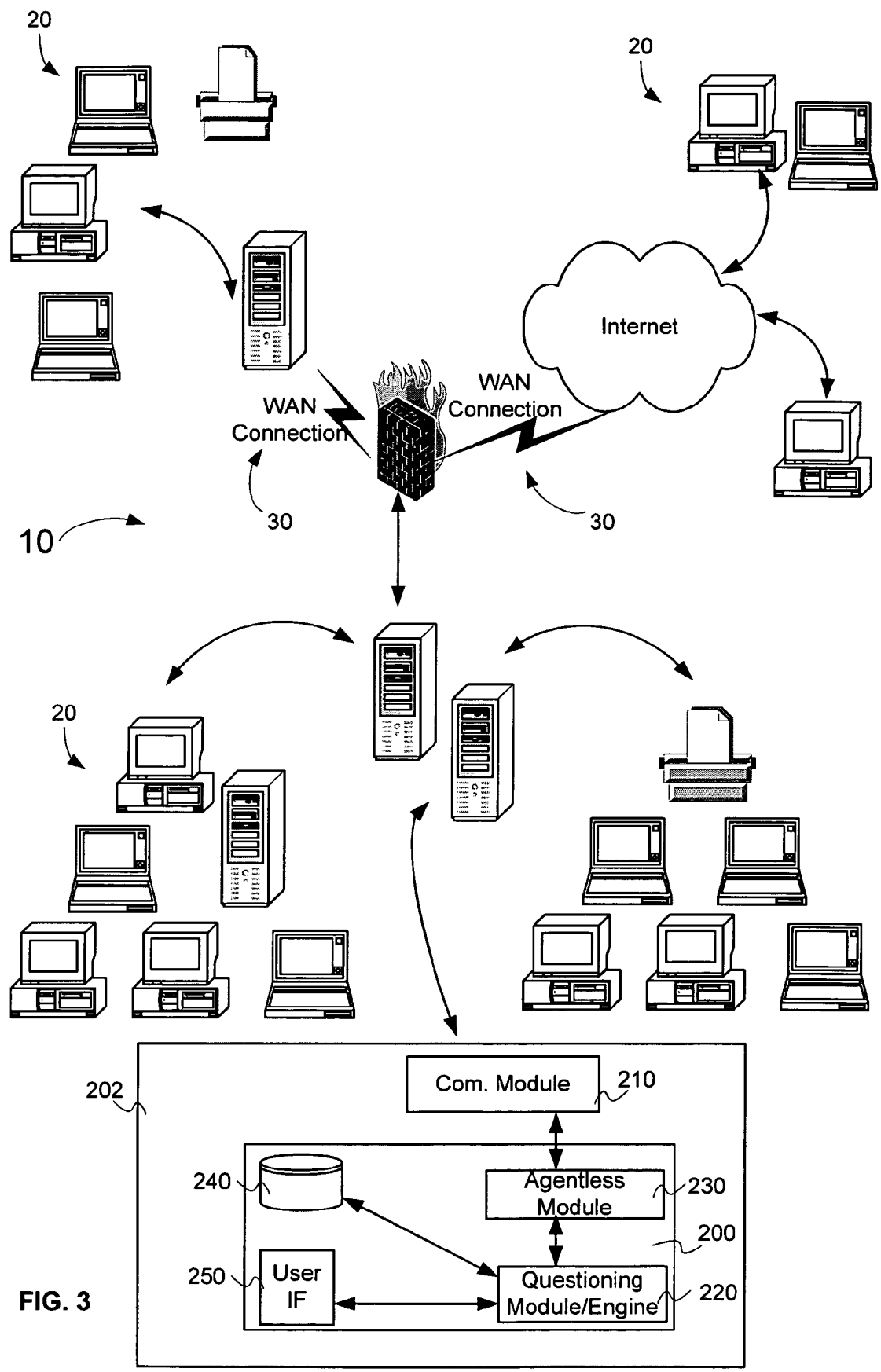
FIG. 3 is a block diagram illustration of a typical organization's network including a device for questioning computerized devices within an organization's network, as part of some embodiments of the present invention.

FIG. 3 shows a block diagram illustration of a typical organization's network including a device for questioning computerized devices within an organization's network, as part of some embodiments of the present invention. In FIG. 3, the organization's network 10 is shown to be comprised of a few LANs 20 connected together using different types of connections (for example—dedicated lines, the Internet) forming the WAN 30, which may serve, for example, two (or more) different locations or branches of the organization. It should be noted that the present invention is not limited to any particular network architecture and that rather, in accordance with some embodiments of the present invention, any group of computerized devices forming a network of an organization may be considered to be "an organization's network".

As part of some embodiments of the present invention, the device 200 for questioning computerized devices within an organization's network 10 may be connected to the organization's network 10. For example, as is shown in FIG. 3, the device 200 may be part of one of the LANs 20, and may be operatively connected to the WAN 30 and to the remote computerized devices connected to the LAN 20 (and which are at least partially under the control of the organization's network 10 administer(s)).

Returning now to FIG. 1, in accordance with some embodiments of the present invention, the device 200 may be operatively coupled to or may include a communication module 210. The communication module 210 may be, for example, a Network Interface Card (NIC) of a security manager's computer 202 to which the device 200 may be operatively coupled or included within. The communication module 210 may be configured to enable the device 200 to communicate with at least some, and typically all, of the computerized devices within the organization's network 10. It should be noted that the communication module 210 is included as part of the device 200 in accordance with optional embodiments of the device 200, and that in accordance with some embodiments of the present invention, the communication module 210 may be omitted from the device 200, and an external communication interface or module may be utilized by the device 200 or by one or more components of the device 200 to communicate with the computerized devices in the organization network 10.

In accordance with some embodiments of the present invention, the device 200 may include a storage device 240. The storage device 240 may be used to store predetermined data relating to the computerized devices within the organization network 10 and/or data relating to predefined questioning subjects. The data within the storage device 240 may be organized in any data structure, including but not limited to one or more databases. In accordance with further embodiments of the present invention, the device 200 may include a user interface or interfaces 250. The user interface 250 may be used to enable receipt of data from a user of the device 200 and/or to output data for the user (for example, to display results or to print reports). For example, the user may utilize the user interface 250 to input data relating to computerized devices to be questioned and/or to create new questioning subjects or to update existing questioning subjects to be questioned on the specified computerized devices, or to select existing questioning subjects to be questioned on the specified computerized devices. In accordance with yet further embodiments of the present invention, the device 200 may be coupled to exterior data sources, such as an organizational prime domain controller (PDC) an organizational active directory (AD) or various kinds of files, from which data relating to computerized devices to be questioned and/or to questioning subjects to be questioned may be imported. Each of the above data sources may be used as an alternative or in combination with one another to specify the computerized devices to be questioned and/or to select or create the questioning subject to be questioned on the specified computerized devices. For example, a substantially complete list of all the users within the organizational network 10 may be obtained from an organizational active directory and the user may utilize the user interface 250 to specify which of these computerized devices are to be questioned.

In accordance with some embodiments of the present invention, once the computerized devices to be questioned are specified, if necessary, the questioning module 220 may be adapted to obtain from one or more of the data sources (or data input interfaces) mentioned above, data relating to the ID of the computerized devices to be questioned. However, in case the ID of some or all of the specified computerized devices is provided to the questioning module 220 as part of the specification thereof, for these computerized devices, it may not be necessary to separately obtain an ID. The computerized devices to be questioned may be specified by their network address (IP address, for example) and/or by the computerized device's name within the network (host name). However, any other suitable identification data known in the present or yet to be devised in the future may be used in accordance with some embodiments of the present invention. In accordance with some embodiments of the present invention, the list of computerized devices to be questioned may be temporarily stored on a storage medium, for example on the device's 200 storage medium 240. In accordance with some embodiments of the present invention, as part of utilizing the multiple threads of the agentless module 230, the questioning module 220 may provide to each thread of the agentless module 230, the ID(s) of the computerized devices which have been or are being assigned to that thread of the agentless module 230.

In accordance with some embodiments of the present invention, one or more, and possibly all, of the questioning subject may be associated with a specific location (and possibly, more than one location) within at least the registry of a computerized device. Returning now to FIG. 2, in accordance with some embodiments of the present invention, once the questioning subjects to be questioned on the specified computerized devices are selected, the questioning module 220 may be adapted to obtain, for each of the selected questioning subjects, data directing to a specific location or locations within at least a registry (or data providing a path(s) to specific location(s)) of a remote computerized device (block 122). The data directing to a location or locations within at least a registry of a remote computerized device may indicate where data associated with the questioning subject may be found or is expected to be found on a computerized device.

In accordance with yet further embodiments of the present invention, in addition, for one or more of the selected questioning subjects, data relating to specific data (a specific value, for example) which may be found in the specified location(s) may also be obtained by the questioning module 220 (block 124). In accordance with yet further embodiments of the present invention, the data relating to the specific indications data which may be found in the specified location(s) may be indicative, if the indications are found in the specified location(s), of a security threat.

In accordance with some embodiments of the present invention, the data directing to a specific location or locations on a remote computerized device and/or the data relating to the specific data which may be found in the specified location(s), may be presorted and may be automatically obtained for each of the selected questioning subjects or only for some. However, in accordance with further embodiments of the present invention, the data directing to a specific location or locations on a remote computerized device and/or the data relating to specific data which may be found in the specified location(s) may be manually provided by a user, for one or more of the selected questioning subjects, following the selection thereof.

In accordance with some embodiments of the present invention, as part of utilizing the multiple threads of the agentless module 230, the questioning module 220 may provide for each thread of the agentless module 230, the relevant data directing to a specific location or locations on a remote computerized device and/or the relevant data relating to specific data which may be found in the specified location(s), in accordance with the questioning subjects assigned to that thread of the agentless module 230.

In accordance with further embodiments of the present invention, as part of invoking one or more of the remote access processes 260, each thread of the agentless module 230 may be adapted to configure or program the remote access process(es) 260, to determine, as part of questioning the remote computerized devices, whether the computerized devices include data in the location associated with the questioning subject. In accordance with further embodiments of the present invention, as part of questioning a remote computerized device for a questioning subject, the remote access processes 260 used for the questioning may be configured to cause the remote computerized devices to return an indication relating to the existence of data in a specified location associated with the questioning subject or the lack of thereof and in the case where data is found, as a further part of the questioning, to return an indication relating to the actual data found in the specified location. The location to which the indication may relate may be the location associated with the questioning subject questioned on the computerized device. In accordance with further embodiments of the present invention, an appropriate indication may be returned for each questioning subject and for each computerized device on which the questioning subject was questioned. It should be noted that in accordance with some embodiments of the present invention, the remote access processes, which may be for example, but are not limited to, various APIs, may use any necessary tools in order to generate appropriate queries in a manner to question the remote computerized devices in accordance with the questioning subjects.

In accordance with further embodiments of the present invention, as part of invoking one or more of the remote access processes, each thread of the agentless module 230 may be adapted to configure or program the remote access process(es) 260 to determine whether the actual data found on the remote computerized device in connection with a certain questioning subject fulfills a predefined relationship with a predefined value (or if the data found is of a certain type (or not)) associated with that questioning subject. In accordance with yet a further embodiment of the present invention, as part of invoking one or more of the remote access processes, each thread of the agentless module 230 may be adapted to configure or program the remote access process(es) 260 to determine whether the data found in a specific location within a registry of a computerized device fulfils a predefined relationship with a predefined registry key name(s), registry value name(s) and/or registry value data(s) associated with the questioning subject that is associated with that specific location. It should be noted that in order to enable the remote access processes to determine whether the actual data found on the remote computerized device in connection with a certain questioning subject fulfils a predefined relationship with a predefined value, some of the presently known remote access processes may require some modifications and/or enhancements which will be readily apparent to those of ordinary skill in the art. It should be further noted, that the process of comparing the results against predefined values may optionally be carried out as part of a results analysis process either as an alternative or in addition to the comparison discussed above. The handling of the results of the questioning shall be discussed in greater detail hereinbelow.

In accordance with further embodiments of the present invention, as part of invoking one or more of the remote access processes, each thread of the agentless module 230 may be adapted to configure or program the remote access process(es) 260 being invoked by that thread, to question one or more of the specified computerized devices for one or more questioning subjects, in accordance with the ID(s) of the computerized devices assigned to that thread, and in accordance with the data directing to a specific location or locations corresponding to the questioning subject which have been assigned to that thread. In accordance with yet further optional embodiments of the present invention, as part of invoking one or more of the remote access processes, one or more threads of the agentless module 230 may be adapted to configure or program the remote access process(es) 260 being invoked by that (or these) thread(s), to compare the actual data found in a specific location on a remote computerized device with the presorted data relating to one or more specific indications which may be found in the specified location(s). In accordance with yet further embodiments of the present invention, as part of invoking one or more of the remote access processes, one or more threads of the agentless module 230 may be adapted to configure or program the remote access process(es) 260 being invoked by that (or these) thread(s), to return a certain predefined indication in case the presorted data and the actual data found in the specified location fulfill a certain relation. More than one relation may be predefined and a different indication may be associated with each relation. The thread of the agentless module 230 may accordingly configure the remote access process.

In accordance with some embodiments of the present invention, the specified computerized devices to be questioned may be predefined or may be specifically selected for each scan. In accordance with further embodiments of the present invention, a list of computerized devices may be provided before each scan, for example, a list including all the computerized devices connected or associated with the organization's network 10, and the computerized devices to be questioned may be selected from the comprehensive list. In case the list of computerized devices to be questioned is predefined, the list may be stored in a database or in any other data structure which may be stored on a memory or on the storage device 240 (a hard disc, for example). In accordance with further embodiments of the present invention, in case the list of computerized devices is created specifically for each scan of the computerized devices, many methodologies and techniques and any combination thereof may be used to compile the list. For example, the computerized devices to be questioned may be automatically selected in accordance with predefined criteria, and/or the computerized devices to be questioned may be manually selected by a user, for example through the user interface 250. Any of the techniques or methodologies described above may be used in combination with any other to create the list of computerized devices to be questioned.

In accordance with some embodiments of the present invention, the questioning module 220 may be adapted to assign for each of the specified computerized devices to be questioned one or more questioning subjects to be questioned on that computerized device. In accordance with some embodiments of the present invention, the questioning subject(s) which are to be questioned on each computerized device may be pre-selected in advance, or may be manually selected by a user for each questioning process. In accordance with some embodiments of the present invention, the questioning subjects may be associated with security threats, for example, each questioning subject may be associated with one or more specific threats. In accordance with further embodiments of the present invention, the questioning subjects may be associated with various applications, services and/or hardware devices (typically, but not necessarily, auxiliary hardware devices, such as USB storage devices), which an evidence of which, or of a certain combination of which, may be indicative of a security threat if found on a computerized device connected to or associated with the organization's network.

In accordance with some embodiments of the present invention, the questioning subject may be predefined and/or may be manually or semi-manually defined by a user. In case a certain questioning subject is defined by a user, the user may utilize the user interface 250 to provide the questioning module 220 with data regarding the questioning subject, possibly in addition to presorted data associated with questioning subject. In accordance with some embodiments of the present invention, data relating to predefined questioning subjects may be presorted on a storage medium, for example, storage medium 240, and the relevant data may be retrieved from the storage medium once the questioning subjects to be questioned on the selected computerized devices are selected. For example, in accordance with some embodiments of the present invention, the storage medium 240 may be used to store a data structure or a database including data relating to a plurality of predefined questioning subjects. In accordance with some embodiments of the present invention, the data stored in the database may be, but is not necessarily, associated with known security threats.

An example of a possible questioning subjects database including data associated with questioning subjects is illustrated in FIG. 4A, to which reference is now made. Each questioning subject may be identified by a certain name. The subject's name may be, for example, the name which is commonly used to refer to the threat with which the subject is associated, however, any name may be used. In addition to the subject's name, as is shown in FIG. 4A, for each questioning subject, one or more paths directing to a specific location or locations on a remote computerized device may be provided. In accordance with some embodiments of the present invention, the paths or path may be associated with a location or locations on a remote computerized device where data associated with the questioning subject may be found or is expected to be found in case, for example, the security threat associated with the questioning subject is present on the computerized device. For example, the paths or path may be associated with a location or locations on a remote computerized device, where an indication of the presence of an application, a service or a hardware device may be found, and which indication, if found (for example, in the specified location), may be indicative of a known security threat.

In accordance with further embodiments of the present invention, the questioning subjects database may include for one or more of the questioning subjects therein, data relating to specific indications (data) or values which may be found in the specific location provided for that or these questioning subject(s). For example, the indication(s) may be indicative of a known security threat if found in the specified location within a computerized device or the indication(s) may be expected to be found in case a known security threat is present on a computerized device being questioned. One possible example of such an indication may be a status indication. The status indication may, for example, indicate whether a known security threat is present on the computerized device where the indication has been found and/or whether it has been installed on the computerized device where the status indication has been found, and/or whether the security threat associated with the indication is active on the computerized device where the indication has been found. In accordance with some embodiments of the present invention, one or more of the questioning subjects may be associated with one or more locations within a registry of a computerized device and/or other location or locations in the computerized device.

In accordance with some embodiments of the present invention, for at least one of the questioning subjects, the database may include data relating to one or more locations within a registry of a computerized device where data associated with the questioning subject is expected to be found. In accordance with further embodiments of the present invention, in addition to the data relating to one or more locations within a registry of a computerized device where data associated with the questioning subject is expected to be found, the database may include data pointing to other locations within a computerized device (for example, outside the registry) where data associated with the questioning subject is expected to be found. Such locations may include but are not limited to a computerized device's add/remove list, service list, process list, recent file used and elsewhere.

It should be noted that additional data which may be associated with one or with a group of questioning subjects may also be included in the questioning subjects database. Such data may include, for example, various unique characteristics associated with various questioning subjects, an icon, a description of the subject, a category with which the subject may be associated with, data relating to the information (a specific registry key or registry value, for example) which may be found in the location within the computerized device which is associated with the questioning subject, a permitted value(s) and/or un-permitted value(s) in the location within a computerized device which is associated with the questioning subject, etc.

In accordance with some embodiments of the present invention, as mentioned above, as part of utilizing or utilizing the threads of the agentless module 230, the questioning module 220 may be adapted to configure each of the threads of the agentless module 230 being utilized to cause one or more remote access processes 260 to be invoked in a manner to remotely question without using agents, at least a registry of one or more computerized devices assigned to that thread, in accordance with one or more questioning subjects which have been assigned to that thread and which have been selected to be questioned on that or these computerized devices. One example of a remote access process 260 which may be invoked by the threads of the agentless module 230 to question at least the registries of the specified computerized devices, may include one or more application programming interfaces (API), including an API capable of remotely questioning the registries of remote computerized devices. It will be appreciated by those of ordinary skill in the art, that various remote access processes 260, including various APIs, may be an integrated component of some operating systems sold on the market, however, other APIs may also be used. In accordance with further embodiments of the present invention, the threads of the agentless module 230 may invoke various APIs in a manner to question at least a registry of the specified computerized devices, in accordance with the questioning subjects, but possibly other locations, such as for example, an add/remove list, service list, recent file used or an active process list, within the computerized devices where data associated with the questioning subjects is expected to be found. It would be appreciated that the threads of the agentless module 230 may be configured to invoke different remote access processes, and various APIs, in a manner to cause the remote access process to question various locations and/or data sources on the specified computerized devices to be questioned.

For illustration, in accordance with one embodiment of the present invention, in case one of the threads of the agentless module determines that a registry API is to be used for questioning the registries of one or more of the computerized devices, the agentless module 230 may invoke the registry API. Next, the thread of the agentless module may request the operating system to instruct the registry API to open a certain path, key or library which is associated with a certain questioning subject. The thread of the agentless module may request the operating system to instruct the registry API to return to the device an indication relating to whether data is found or not in the specified location or the agentless module may request the operating system to instruct the registry API to return to the device an indication relating to the actual data found in the specified location.

In accordance with some embodiments of the present invention, the questioning module 220 may be adapted to determine the number of threads of the agentless module 230 to be utilized in parallel. The number of threads of the agentless module 230 may be selected manually by a user or may be determined automatically, in accordance with predefined parameters, for example, network performance or available bandwidth parameters. According to one embodiment of the present invention, the questioning module 220 may be pre-configured to utilize various numbers of threads of the agentless module 230, and a user may select the desired number of threads of the agentless module 230, for example, by selecting the desired operation speed (for example—very slow, slow, medium, high and very high).

In accordance with some embodiments of the present invention, once the questioning module 220 determines the number of threads of the agentless module 230 to be utilized in parallel, the questioning module 220 may be adapted to assign to each thread of the agentless module 230 one or more of the specified computerized devices. In accordance with some embodiments of the present invention, the questioning module 220 may be adapted to determine which of the specified computerized devices is to be assigned to which thread of the agentless module 230 and/or what number of the specified computerized devices is to be assigned to each thread of the agentless module 230. In accordance with some embodiments of the present invention, the specified computerized devices to be questioned may be randomly and equally divided between the threads of the agentless module 230 to be utilized. In accordance with further embodiments of the present invention, the specified computerized devices to be questioned may be divided amongst the threads of the agentless module 230 to be utilized in accordance with predefined rules and/or based upon predefined parameters, such as, for example, the amount of bandwidth available for communication from the device 200 to a certain computerized device to be questioned, and may not necessarily be equally divided among the threads of the agentless module 230. However, the present invention is not limited in this respect, and the questioning module 220 may be configured to otherwise determine which of the specified computerized devices is to be assigned to which thread agentless module 230, and/or what number of the specified computerized devices is to be assigned to each thread of the agentless module 230. For example, in accordance with one embodiment of the present invention, the questioning module 220 may be configured to substantially evenly divide the specified computerized devices to be questioned between all the threads of the agentless module 230 which are to be utilized.

Reference is now made to FIG. 4B, in which there is shown an illustration of a table including an entry for each thread of the agentless module to be utilized and the data corresponding to the computerized device(s) and to the questioning subject(s) assigned to that thread, according to some embodiments of the present invention. In accordance with some embodiments of the present invention, as part of the configuration of the agentless module 230, the questioning module 220 may be adapted to generate a table including an entry for each thread of the agentless module 230 to be utilized, as determined by the questioning module 220. In accordance with some embodiments of the present invention, for each thread of the agentless module 230 to be utilized, the questioning module 220 may be adapted to record in the table data corresponding to the computerized device(s) and to the questioning subject(s) assigned to that thread. The decision by the questioning module 220 as to the number of threads of the agentless module 230 to be utilized has been discussed above with greater detail. The decision by the questioning module 220 as to which computerized device(s) and/or as to which questioning subjects to assign to which thread of the agentless module 230, may be arrived at in accordance with any predefined rules and/or based upon any predefined parameters, including, but not limited to, various equal distribution schemes.

In accordance with further embodiments of the present invention, the questioning module 220 may be adapted to record in the table for each thread of the agentless module 230 data identifying the computerized devices to be questioned by that thread. The questioning module 220 may be adapted to record in the table for each thread of the agentless module 230 data directing to a specific location or locations on a remote computerized device where data corresponding to the questioning subjects assigned to that thread may be found on a computerized device. In accordance with further embodiments of the present invention, the questioning module 220 may be adapted to record in the table for one or more threads of the agentless module 230 data corresponding to one or more specific indications (data) or values which may be found in the specific location or locations, and which if found in the specific location or locations may be, for example, indicative of a security threat. The questioning module 220 may be adapted to record in the table for each thread of the agentless module 230 any other data including, but not limited to, data which may be used by the agentless module 230 to configure one or more of the remote access processes 260 to remotely question one or more of the specified computerized devices in accordance with the questioning subjects to be questioned on the specified computerized devices.

In accordance with some embodiments of the present invention, a table comprising an entry for each thread of the agentless module 230 to be utilized may be created for each questioning process and may be (temporarily) stored on the storage medium 240. In accordance with further embodiments of the present invention, the questioning module 220 may use the data in the table to configure each thread of the agentless module 230 with the data necessary for each agentless module 230 to invoke and configure the remote access processes 260 and to configure each of the processes to remotely question, without using agents, at least a registry of one or more of the computerized devices assigned to that thread of the agentless module in accordance with the questioning subjects to be questioned on that or these computerized devices.

In accordance with some embodiments of the present invention, each thread of the agentless module 230 may be adapted to use the data in the table (such as the one shown in FIG. 4B or in any other similar table) to invoke and to configure one or more remote access processes 260 to remotely question at least a registry of one of more of the computerized devices assigned to that thread in accordance with one or more of the questioning subjects selected to be questioned on that computerized device. The agentless module 230 may include the necessary data, for example, the necessary logic needed to invoke and to configure one or more remote access process 260 to question at least the registries of one or more computerized devices in accordance with the questioning subjects selected for the computerized device(s). For example, in case the remote access processes 260 include one of the open APIs which are included as part of one of the Microsoft Windows operating systems, the agentless module 230 may include the necessary data or logic to enable one or more threads of the agentless module 230 to invoke the API(s) and to configure the API(s) to remotely question one or more computerized devices in accordance with one or more questioning subjects. For example, the agentless module 230 may include the necessary data or logic to create a suitable query to cause an API to generate a remote scanning process for questioning one or more computerized devices in accordance with one or more questioning subjects. It would be appreciated that, according to some embodiments of the present invention, the invocation and the configuration of the remote access process may be part of the same action.

In accordance with some embodiments of the present invention, a plurality of threads of the agentless module 230 may invoke the remote access process(es) 260 simultaneously. For example, each thread may generate one or more queries intended to cause a remote access process 260 to remotely, and without using agents, question at least the registry of a computerized device in accordance with one or more of the questioning subjects devices to be questioned on that computerized device and which have been assigned to that thread. The plurality of queries from the plurality of threads agentless module 230 may cause a plurality of remote access processes 260 to be invoked. In accordance with further embodiments of the present invention, the plurality of queries from the plurality of threads agentless module 230 may cause the plurality of the remote access processes 260 to question in parallel and without using agents at least the registries of the specified computerized devices in accordance with the questioning subjects selected for the specified computerized devices.

In accordance with some embodiments of the present invention, one or more of the queries may be created by one or more of the remote access processes 260 in a manner to cause the data stored in one or more predefined locations within each of the specified computerized devices (in accordance with the questioning subjects selected for that computerized device) to be retrieved. In accordance with further embodiments of the present invention, at least one of the queries may be configured in a manner to cause (one or more of) the remote access process(es) to question one or more predefined locations within the registries of the specified computerized devices in accordance with the questioning subjects selected for that computerized device. In accordance with some embodiments of the present invention, one or more of the remote access process(es) may be configured in a manner to compare the data or value stored in a specific location within one or more of the computerized device(s) against a predefined value or predefined data.

In accordance with some embodiments of the present invention, the queries may be configured to cause the remote access processes 260 to question one or more predefined locations within each of the specified computerized devices in accordance with the questioning subjects selected for that computerized device. In accordance with further embodiments of the present invention, the queries may be created in a manner to cause data corresponding to the results of the questioning of each of the computerized devices to be returned to the device 200, for example, to the questioning module 220. In accordance with further embodiments of the present invention, the results may relate to each questioning subject which was questioned on each of the computerized devices.

In accordance with some embodiments of the present invention, as part of the questioning process, the remote access processes 260 may create one or more of the queries in a manner to cause data corresponding to the data found (or the lack of thereof) within the designated locations in the specified computerized devices, to be returned in accordance with the questioning subjects questioned on the computerized devices. The returned data corresponding to the data found within the computerized devices in accordance with the questioning subject questioned on the computerized devices may be received at device 200 (block 160), for example, at the questioning module 220. The handling of the data received from the computerized devices in accordance with some embodiments of the present invention shall be described in detail hereinbelow.

According to some embodiments of the present invention, the questioning module 220 may include a results analysis module 225. In accordance with some embodiments of the present invention, the results analysis module 225 may be adapted to receive the queries results received at device 200 in response to the queries. In accordance with some embodiments of the present invention, the results analysis module 225 may be adapted to collect some or all of the results of the queries and may generate a report including various data corresponding to the results. The report may include various details regarding the queries results, for example, it may include one or more entries each including details regarding the data found on a specified computerized device in a specific location associated with a certain questioning subject questioned on that computerized device. The report may include additional data, such as, for example, data relating to the computerized device associated with a certain result and/or the questioning subject associated with a certain result, as well as additional data. In accordance with further embodiments of the present invention, the report may include only data relating to queries results which were not in compliance with one or more conditions associated with one or more questioning subjects with which the queries were associated. Any technique may be used to generate the reports, and the reports may be in many formats and in many forms.

In accordance with further embodiments of the present invention, the data corresponding to the queries results may initially undergo processing and the processed data may be used to generate the report. For example, data relating to the existence/non-existence of data in certain location(s) within certain computerized devices may be compared against predefined rules correlated with the questioning subjects associated with the data, for example, in accordance with rules which specify in which locations within the computerized devices data is allowed to be stored and in which data is not allowed. In this case, if data is found where it is indicated to not be allowed, the report may include an indication to that effect, but otherwise no reference may appear in the report. However, the present invention is not limited in this respect as any other rules may be applied to the queries results.

In accordance with some embodiments of the present invention, the questioning module 220 and in particular the results analyses module 225 may store specific records from the results report or the results report in its entirety. As part of storing the results, the results analysis module 225 may record for each result a timestamp corresponding to the time at which the result was received. The results analyses module 225 may compare the results of each report with the results of any one or more previous reports. In accordance with further embodiments of the present invention, the results analysis module 225 may store for each computerized device the results of the questioning of that device. The results may thus, for example, reflect the activity on one or more of the devices which were questioned over a certain period of time.

Furthermore, in accordance with some embodiments of the present invention, the queries results may be analyzed by the results analysis module 225, and based on the results of the analysis, the results analysis module 225 may be adapted to execute one or more predefined actions (or not), for example, in case one or more of the results is not in compliance with one or more predefined rules. In accordance with some embodiments of the present invention, one or more of the rules may relate to previous data fond or not found in the remote computerized device. Some examples of rules which may be used to analyze the results may include, but are not limited to, rules relating to the existence of data in a certain location(s), the removal of data in a certain location(s), the addition of data in a certain location(s), regarding the type and/or the value of the data in a specific location(s), etc. The actions which may be executed by the results analysis module 225 may include, for example, sending an email message to a user using a certain computerized device, disconnecting a certain computerized device from the organizational network, shutting down a certain process, removing a certain application, etc. Furthermore, in accordance with some embodiments of the present invention, the results analysis module 225 may be adapted to utilize one or more threads of the agentless module 230 to invoke one or more remote access process(es) 260 (for example, the ones used to question the specified computers) and to configure the remote access process(es) 260 to modify (write, overwrite, modify, delete, etc) certain data on a remote computerized device. For example, the results analysis module 225 may be adapted to utilize one or more threads of the agentless module 230 to invoke one or more remote access process(es) 260 and to configure the remote access process to write new data in a specific location on one or more computerized devices, e.g., the computerized devices which were questioned and which have been determined to include data which is not in compliance with the predefined rules.

While certain features of the invention have been illustrated and described herein, many modifications, substitutions, changes, and equivalents will occur to those skilled in the art. It is therefore to be understood that the appended claims are intended to cover all such modifications and changes as fall within the true scope of the invention.

The invention claimed is:

1. A device for internally questioning a plurality of computerized devices in an organization's network, said device comprising:
    a microprocessor coupled to a non-transitory computer-readable medium encoded with a computer program,
    wherein the microprocessor is programmed to:
    receive data specifying the plurality of computerized devices to be questioned;
    receive data indicating which one or more questioning subjects are to be questioned within the plurality of computerized devices, at least one of the questioning subjects is associated with one or more specific locations within a computerized device;
    invoke and configure a plurality of threads of a remote access process running locally within the device to remotely question in parallel and without using agents a plurality of the specified computerized devices according to respective questioning subjects;
    process results received in response to the questioning of one or more of the specified plurality of computerized devices, and generate a report corresponding to the results;
    compare one or more results relating to actual data found as part of the questioning of one or more of the specified plurality of computerized devices against predefined data; and
    execute one or more predefined actions or procedures based on one or more of the received results.

2. The device according to claim 1, wherein the questioning subjects are associated with security threats.

3. The device according to claim 2, wherein the questioning subjects are associated specific locations within at least the registry of a computerized device, where an indication of a security threat may be found during questioning.

4. The device according to claim 1, wherein said microprocessor is programmed to invoke and configure a substantially large number of threads of the remote access process to thereby remotely question without using agents and in parallel a substantially large number of the specified plurality of computerized devices.

5. The device according to claim 1, wherein said microprocessor is programmed to select which one or more of the questioning subjects are to be questioned on each one of the specified plurality of computerized devices.

6. The device according to claim 5, further comprising a user interface to enable a user to select, either directly or indirectly, one or more of the specified plurality of computerized devices.

7. The device according to claim 6, wherein said user interface may further enable a user to select, either directly or indirectly, which one or more questioning subjects are to be questioned on one or more of the specified plurality of computerized devices.

8. The device according to claim 1, wherein said microprocessor is programmed to determine a number of threads of the remote access process to be invoked and configured to remotely question the specified plurality of computerized devices.

9. The device according to claim 8, wherein said microprocessor is programmed to determine the number of threads of the remote access process to be invoked and configured in accordance with one or more of the following: a number of computerized devices to be questioned in parallel, a desired questioning speed, one or more network performance parameters, subjects to be questioned, and a subject's severity.

10. The device according to claim 1, wherein said microprocessor is programmed to assign to each thread of the remote access process one or more of the specified plurality of computerized devices.

11. The device according to claim 10, wherein said microprocessor is programmed to assign to each thread of said remote access process one or more questioning subjects selected to be questioned on one or more of the specified plurality of computerized devices that have been assigned to that thread of said remote access process.

12. The device according to claim 11, wherein said microprocessor is programmed to configure each invoked thread of said remote access process to question one or more specific locations within the computerized devices assigned to that thread, in accordance with the respective one or more questioning subjects selected for each of the computerized devices and which have been assigned to that thread.

13. The device according to claim 12, wherein said microprocessor is programmed to configure each invoked thread of said remote access process to question one or more specific locations within at least a registry of the computerized devices assigned to that thread, in accordance with the respective one or more questioning subjects selected for each of the computerized devices and which have been assigned to that thread.

14. The device according to claim 12, wherein said microprocessor is programmed to assign to one or more threads of said remote access process predefined data corresponding to certain data which may be found in one or more of the specified locations associated with one or more of the questioning subjects assigned to that or these thread or threads.

15. The device according to claim 14, wherein said microprocessor is programmed to configure one or more of the invoked threads of the remote access process to compare actual data associated with one or more of the questioning subjects that was found within the computerized devices assigned to that or these threads against the predefined data associated with the respective questioning subjects.

16. The device according to claim 7, further comprising one or more databases including prestored data corresponding to one or more computerized devices, and wherein as part of specifying the computerized devices to be questioned, prestored data corresponding to computerized devices may be obtained from said database.

17. The device according to claim 7, further comprising one or more databases including prestored data corresponding to one or more questioning subjects, and wherein as part of selecting one or more questioning subjects to be questioned on the specified computerized devices, prestored data corresponding to one or more questioning subjects may be obtained from said database.

18. The device according to claim 1, wherein said microprocessor is programmed to utilize one or more threads of the remote access process to modify or delete certain data on one or more of the specified plurality of remote computerized devices which were questioned.

19. The method according to claim 18, wherein said invoking and configuring further comprises assigning to each of the plurality of threads of the remote access process one or more of the specified plurality computerized devices, and one or more of questioning subjects to be questioned on the one or more computerized devices.

20. The method according to claim 19, further comprising determining a number of threads of the remote access process to be invoked, in accordance with one or more of the following: a number of computerized devices to be questioned in parallel, a desired questioning speed, one or more network performance parameters, subjects to be questioned, and a subject's severity.

21. The method according to claim 19, wherein said assigning further comprises assigning to one or more of the of threads of the remote access process data corresponding to one or more specific locations within the computerized devices assigned to that or these threads, in accordance with one or more of respective questioning subjects selected to be questioned on the computerized devices.

22. A method of internally questioning a plurality of computerized devices in an organization's network, said method comprising:
   specifying a plurality of computerized devices to be questioned;
   selecting one or more questioning subjects to be questioned on the specified plurality of computerized devices, at least one of the questioning subjects being associated with one or more specific locations within a computerized device;
   invoking and configuring a plurality of threads of a remote access process running locally within a questioning device to remotely question, in parallel and without using agents, a plurality of the specified computerized devices, in accordance with respective questioning subjects;
   processing results received in response to the questioning of one or more of the specified plurality of computerized devices, generating a report corresponding to the results;
   comparing one or more results relating to actual data found as part of the questioning of one or more of the specified plurality of computerized devices against predefined data; and
   executing one or more predefined actions or procedures based on one or more of the received results.

23. The method according to claim 22, wherein said selecting one or more questioning subjects further comprises, selecting which one or more of the questioning subjects is to be questioned on each of the specified plurality of computerized devices.

24. The method according to claim 22, further comprising:
   receiving results in response to the questioning of at least one of the specified plurality of computerized devices; and
   generating a report corresponding to the results received in response to the questioning of the specified plurality of computerized devices.

25. The method according to claim 24, further comprising executing one or more predefined actions or procedures based on one or more of the received results.

26. The method according to claim 25, further comprising utilizing one or more threads of the remote access process to modify or delete certain data on one or more of the remote computerized devices which were questioned.

27. A non-transitory program storage device readable by machine, tangibly embodying a program of instructions executable by the machine to perform a method of internally questioning a plurality of computerized devices in an organization's network, said method comprising:
   specifying a plurality of computerized devices to be questioned,
   selecting one or more questioning subjects to be questioned on the specified plurality of computerized devices, at least one of the questioning subjects being associated with one or more specific locations within a computerized device; and
   invoking and configuring a plurality of threads of a remote access process running locally within a questioning device to remotely question, in parallel and without using agents, a plurality of the specified computerized devices, in accordance with respective questioning subjects;
   processing results received in response to the questioning of one or more of the specified plurality of computerized devices, generating a report corresponding to the results;
   comparing one or more results relating to actual data found as part of the questioning of one or more of the specified plurality of computerized devices against predefined data; and
   executing one or more predefined actions or procedures based on one or more of the received results.

* * * * *